United States Patent [19]
Hockmuth

[11] Patent Number: 4,509,390
[45] Date of Patent: Apr. 9, 1985

[54] DIFFERENTIAL SUMMING MECHANISM

[75] Inventor: Richard L. Hockmuth, Avon, Conn.

[73] Assignee: Petroleum Meter & Pump Co., Inc., Avon, Conn.

[21] Appl. No.: 453,331

[22] Filed: Dec. 30, 1982

[51] Int. Cl.[3] ........................ F16H 37/06; B67D 5/22

[52] U.S. Cl. ........................................ 74/705; 74/681; 74/348; 235/61 L

[58] Field of Search ................. 74/801, 793, 675, 705, 74/348, 681; 348/425; 235/61 L, 61 M

[56] References Cited

U.S. PATENT DOCUMENTS

| | | | |
|---|---|---|---|
| 2,219,024 | 10/1940 | Spaunburg et al. | 74/681 |
| 2,296,966 | 3/1942 | Wild, Jr. | 74/681 |
| 2,330,821 | 10/1943 | Finzi | 74/675 |
| 2,498,821 | 2/1950 | Olsson | 74/681 |
| 2,986,951 | 6/1961 | Carriol | 74/348 |
| 4,136,573 | 1/1979 | Smilgys et al. | 74/348 |

FOREIGN PATENT DOCUMENTS

| | | | |
|---|---|---|---|
| 2460430 | 6/1976 | Fed. Rep. of Germany . | |
| 351094 | 8/1937 | Italy | 74/681 |

OTHER PUBLICATIONS

Hubbard, Checklist for Planetary Gear Sets, Product Engineering, Apr. 3, 1961, pp. 60-61.

*Primary Examiner*—Lawrence J. Staab
*Assistant Examiner*—Arthur T. Quiray

[57] ABSTRACT

A mechanical integrator, such as may be used in a fuel pump variator, is of reduced size, adapting it for use in applications in which the space available is limited. It employs three planetary gears having odd numbers of teeth, and may utilize the mounting shaft as one input signal source. The planetary gears are mounted in a relationship of isosceles triangularity, typically with complementary angles of 108° and 144° therebetween.

7 Claims, 3 Drawing Figures

DIFFERENTIAL SUMMING MECHANISM

BACKGROUND OF THE INVENTION

Differential summing mechanisms, or mechanical integrators, are commonly used to combine two or more rotary input signals, to generate a proportionate cumulative output signal. A particularly important application for such devices is in the variator section of the mechanical computers that are used for fuel pumps, by which the unit volume price of the fuel product can be selectively set. Signals proportionate to the digits or places of the price are generated, normally through the use of separate range arm assemblies that are selectively positionable in engagement with one of the elements of a gear stack or cone gear, which signals are combined in the summing mechanism to generate a signal that is representative of the total unit price.

Typically, such mechanical integrators consist of at least two gear plates coaxially mounted upon a shaft, one of which plates has an external circumferential tooth formation and rotatably mounts, in diametrical positions, a pair of compound planetary gears; the other gear plate will have both external and internal circumferential tooth formations. Rotary motion of the first gear plate is transmitted directly to the mounted planetary gears, and rotary motion of the other plate is transmitted to the same gears through the internal tooth formation. Consequently, the output from the planetary gears (which can be taken from a single pinion driven by them), will be proportionate to the sum of the inputs applied to the two gear plates. Such summing mechanisms may be of multiple effect, and may include stacked planetary gear sets and associated gear plates, such as to provide a cumulative output proportionate to the multiple digits of a posted unit volume fuel price.

For some applications, summing differential mechanisms of the type described have been found to be excessively large, in terms of diameter as well as face-to-face thickness. While it is conceivable that the dimensions of the unit could be reduced simply by using thinner and smaller parts, the torque loadings to which such devices are subjected in operation will make such an approach impractical in many instances. Thinning the parts will obviously weaken them. Reducing the number of teeth on the planetary gears, so as to permit size reduction, will have the same effect, due to the undercutting at the base of each tooth which tends to result from the provision of the required clearance for mating teeth. Such a loss of strength is particularly undesirable in view of the fact that each tooth will be required to carry a greater proportion of the torque load. Furthermore, since the planetary gears utilized in such an integrator normally have even numbers of teeth, the elimination of one tooth will obviously produce an odd number; this will introduce even further difficulties into the design of the unit.

In addition, there are instances in which it is desired to utilize, as the source for one of the input signals, the shaft upon which the integrator is mounted. It is not believed that prior summing mechanisms have adequately accommodated this desire.

Accordingly, it is a primary object of the present invention to provide a novel differential summing mechanism which is capable of being fabricated in relatively small sizes, without reduction in the capability of the unit to withstand normal torque loadings.

It is a more specific object of the invention to provide such an integrator in which the number of planetary gears is increased to three.

Another object of the invention is to provide an integrator having the foregoing features and advantages, in which each of the planetary gears has an odd number of teeth in its circumferential tooth formations.

Yet another object of the invention is to provide such an integrator to which one of the input signals can be taken from the shaft on which the mechanism is mounted.

SUMMARY OF THE INVENTION

It has now been found that the foregoing and related objects of the invention are readily attained in a rotary summing mechanism, suitable for use in a fuel pump variator, comprising an input gear member, a drive gear, and an output gear member coaxially mounted on a shaft, and three identical compound planetary gears disposed between the input and output gear members. The planetary gears are carried by the input gear member in a relationship to one another of isosceles triangularity and in circumferential meshing engagement with the drive gear, and each of the planetary gears has two gear elements thereon. The drive gear is affixed to the shaft for rotation therewith, and is meshed with one of the gear elements of each of the planetary gears. The input and output gear members have tooth formations extending entirely about the outside circumference thereof, and are rotatable on the shaft; the output gear member also has gear teeth extending entirely about an inside circumferential portion thereof, which is meshed with the other gear elements of the planetary gears. Consequently, the summing mechanism will combine rotary inputs from the shaft and the input gear member, to generate a cumulative rotary output from the output gear member.

Preferably, in the summing mechanism the two equal angles between the axes of the planetary gears will have a value of 108°, and the third angle will have a value of 144°. Generally, the planetary gears will be mounted upon posts that depend from the input gear member, and the input gear member will normally be disposed above the output gear member. The length of the mounting posts should be greater than the height of the planetary gears, so that their lower ends ride upon the upper surface of the output gear member, thereby reducing frictional drag. Small bearing rings may also be formed on the bottom surfaces of the planetary gears, for the same purpose.

DETAILED DESCRIPTION OF THE DRAWINGS

Figure 2:
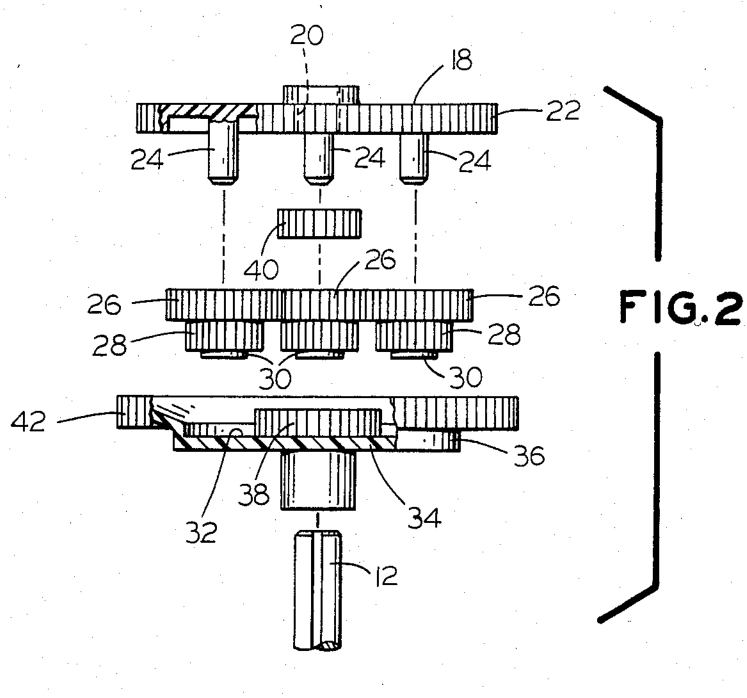
FIG. 2 is an exploded fragmentary elevational view of the summing mechanism, shown in partial section and drawn to a slightly enlarged scale.
Figure 1:
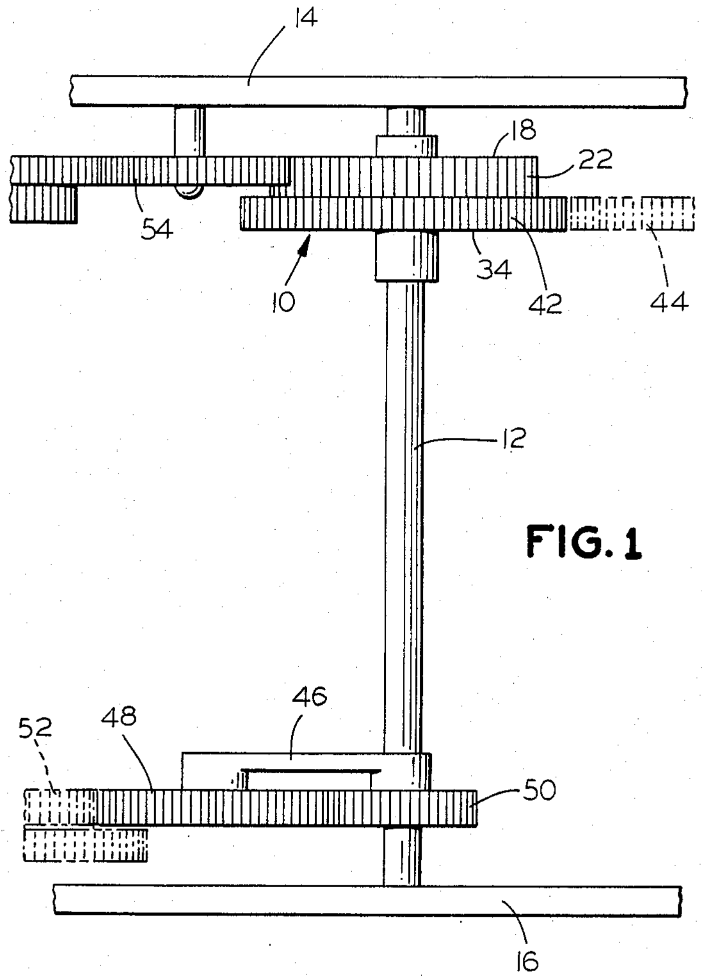
FIG. 1 is a fragmentary schematic representation showing the summing mechanism of the invention installed on the shaft of a range arm assembly of a fuel pump variator.

FIG. 1 of the appended drawing illustrates a portion of a variator in which is employed the summing mechanism of the present invention, the mechanism being generally designated by the numeral 10. As seen in FIG. 2, the summing mechanism 10 is mounted upon the shaft 12 of one of the range arm assemblies of the variator, which is in turn mounted between the cover and base plates 14, 16 thereof, respectively. The generally planar upper gear plate 18 has a central aperture 20 through which the shaft 12 passes, and it has a toothed gear formation 22 extending entirely about its circumference, and a recessed portion to provide space for containing the drive gear 40 and planetary gears 26,28.

Three depending studs 24 are integrally formed on the member 18, and each mounts one of three identical compound planetary gears; the gears consist of larger gear elements 26 and smaller gear elements 28. A bearing ridge 30 is provided on the lower face of each planetary gear, facilitating their sliding movement upon the annular surface 32, which is defined on the bottom wall 34 of the generally planar lower gear member 36 which also has recessed portion to cooperatively provide the space for the gears 26, 28 and 40. Although not apparent from the drawing, the length of the studs 24 is greater than the height of the planetary gears, causing the former to bear upon the surface 32, thereby further minimizing frictional drag.

The lower gear elements 28 of the planetary gears are in meshing engagement with the hub gear 38, which is integrally formed at the center of the lower gear member 36, and the upper gear elements 26 thereof are in meshing engagement with a pinion 40, which is disposed centrally thereof and is keyed to the shaft 12. Consequently, the inputs to the shaft 12 and to the upper gear member 18 are mechanically summed, with the cumulative output being applied to the lower gear member 36. The outer circumferential gear portion 42 thereof may engage one of the gear members 44 (shown in phantom line) of a primary differential summing mechanism, as is more fully described in the copending U.S. application of Tom Stephenson for Letters Patent Ser. No. 453,332, entitled "EXTENDED RANGE VARIATOR FOR FUEL PUMP COMPUTER", which was filed on even date and is of common assignment herewith.

Figure 3:
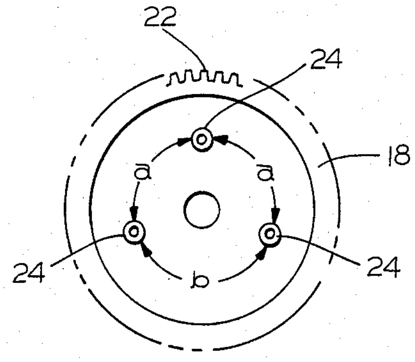
FIG. 3 is a bottom plan view, drawn to a reduced scale, of the input gear member of the secondary summing mechanism.

From FIG. 3 of the drawing, it is seen that the studs 24 by which the planetary gears are mounted on the upper gear member 18 are triangularly disposed, and it will be noted that the angles therebetween are unequal, the angle "b" having a value greater than angles "a", which are the same; i.e., the planetary gears are disposed in a relationship of "isosceles triangularity". This enables the use of planetary gears having an odd number of teeth, in turn permitting the summing mechanism to be reduced in size. In the preferred instances, the value of the angle "a" will be 108°, and that of angle "b" will be 144°.

The range arm structure 46 is pivotably mounted upon the shaft 12, and supports a selector gear 48 on its outer end; its inner portion supports a rack for selective engagement with a detent finger (neither of which is shown), as is conventional in variator design. The selector gear 48 is in meshing engagement with a drive gear 50, which is affixed to the shaft 12 to effect rotation thereof when the selector gear 48 is engaged with one of the gear elements 52 of the cone gear of the variator, which is shown in phantom line; this provides one input to the integrator. The other input may be provided from a different range arm assembly or mechanism, through the idler gear 54, which is mounted on the cover plate 14; such assemblies and mechanisms are also more fully described in the above-mentioned Stephenson application. As is also described in detail therein (the relevant portion of which is hereby incorporated herein by reference), integrators of the present construction may be used as a secondary summing mechanism, and incorporated into the bale of the range arm assembly on which it is mounted. The bale structure provides limited space, and thus represents a specific instance in which an integrator of reduced size is required.

Although the integrator has been described herein as being particularly well-suited for use in a fuel pump variator, it will be evident to those skilled in the art that it is also adapted for other uses, such as in a mechanical counter or like mechanism. As to the specific structure of the gear formations used in the mechanism, both sections of the planetary gears may suitably carry 13 teeth, the shaft pinion may have 10 teeth, and the hub formation on the output gear plate may have 20 teeth; other tooth forms may of course be used, as appropriate. While materials of construction will also be evident, suitable tough and durable plastics, such as the nylons, the polyester resins, and the like, may be used for the gears and other parts to considerable benefit. Although the isosceles relationship between the planetary gears is desirably comprised of complementary 108° and 144° angles, other angular relationships may also be suitable, and can of course be employed if so desired.

Thus, it can be seen that the present invention provides a novel differential summing mechanism which is capable of being fabricated in relatively small sizes, without reduction in the capability of the unit to withstand normal torque loadings. The invention, more specifically, provides an integrator in which the number of planetary gears is increased to three, and in which each of the planetary gears has an odd number of teeth. It also provides such an integrator in which one of the input signals can be taken from the shaft on which the mechanism is mounted.

Having thus described the invention, what is claimed is:

1. A compact rotary summing mechanism comprising: a generally planar input gear member, a drive gear, and a generally planar output gear member disposed for coaxial mounting on a shaft; and three identical compound planetary gears disposed between said input and output gear members, at least one of said input and output gear members having a recessed portion to provide a space therebetween within which said drive gear and said planetary gears are contained, said planetary gears being carried by said input gear member in a relationship to one another of isosceles triangularity and in circumferential meshing engagement with said drive gear, and each of said planetary gears having two gear elements thereon, said drive gear being affixable to the shaft for rotation therewith and being meshed with one of said gear elements of each of said planetary gears, said input and output gear members being rotatable on the shaft, and having tooth formations extending about the entire outside circumference thereof and lying in close axial proximity to one another, said output gear member also having an internal tooth formation extending entirely about an inside circumferential portion thereof and meshed with the other gear elements of said planetary gears, whereby said summing mechanism will combine rotary inputs from the shaft and said input gear member to generate a cumulative rotary output from said output gear member.

2. The mechanism of claim 1 wherein the two equal angles between the axes of said planetary gears have a value of 108°, and the third angle has a value of 144°.

3. A rotary summing mechanism comprising: an input gear member, a drive gear, and an output gear member disposed for coaxial mounting on a shaft with said input gear member above said output gear member; and three identical compound planetary gears disposed between said input and output gear members, said planetary gears having two gear elements, and being carried by said input gear members in a relationship to one another of isosceles triangularity and in circumferential meshing engagement with said drive gear, said drive gear being affixable to the shaft for rotation therewith and being meshed with one of said gear elements of each of said planetary gears, said input and output gear members having tooth formations extending about the entire outside circumference thereof and being rotatable on the shaft, said output gear member also having a tooth formation extending entirely about an inside circumferential portion thereof and meshed with the other gear elements of said planetary gears, said input gear member having three depending posts on which said planetary gears are mounted, the length of said posts being greater than the height of said planetary gears and the lower ends thereof riding upon the upper surface of said output gear member, whereby said summing mechanism will combine rotary inputs from the shaft and said input gear member to generate a cumulative rotary output from said output gear member.

4. The mechanism of claim 3 wherein each of said planetary gears has a bearing ring formed on its bottom surface.

5. In a fuel pump computer variator, a summing mechanism assembly comprising: a shaft; a generally planar input gear member, a drive gear, and a generally planar output gear member coaxially mounted on said shaft; and three identical compound planetary gears disposed between said input and output gear members, at least one of said input and output gear members having a recessed portion to provide a space therebetween within which said drive gear and said planetary gears are contained, said planetary gears being carried by said input gear member in a relationship to one another of isosceles triangularity and in circumferential meshing engagement with said drive gear, and each of said planetary gears having two gear elements thereon, said drive gear being affixed to said shaft for rotation therewith and being meshed with one of said gear elements of each of said planetary gears, said input and output gear members being rotatable on said shaft, and having tooth formations extending about the entire outside circumference thereof and lying in close axial proximity to one another, said output gear member also having an internal tooth formation extending entirely about an inside circumferential portion thereof and meshed with the other gear elements of said planetary gears, whereby said summing mechanism assembly will combine rotary inputs from said shaft and said input gear member to generate a cumulative rotary output from said output gear member.

6. The mechanism of claim 5 wherein the two equal angles between the axes of said planetary gears have a value of 108°, and the third angle has a value of 144°.

7. The mechanism of claim 1 wherein both of said gear elements of said planetary gears have odd numbers of teeth.

* * * * *